(12) United States Patent
Haider et al.

(10) Patent No.: US 9,340,265 B2
(45) Date of Patent: May 17, 2016

(54) ARRANGEMENT OF FLOATING PLATFORMS

(75) Inventors: Markus Haider, Vienna (AT); Christian Diendorfer, Vienna (AT)

(73) Assignee: Technische Universität Wien, Vienna (AT)

( * ) Notice: Subject to any disclaimer, the term of this patent is extended or adjusted under 35 U.S.C. 154(b) by 44 days.

(21) Appl. No.: 14/232,109

(22) PCT Filed: Jul. 9, 2012

(86) PCT No.: PCT/AT2012/050097
§ 371 (c)(1),
(2), (4) Date: May 12, 2014

(87) PCT Pub. No.: WO2013/006882
PCT Pub. Date: Jan. 17, 2013

(65) Prior Publication Data
US 2014/0245941 A1  Sep. 4, 2014

(30) Foreign Application Priority Data
Jul. 13, 2011  (AT) .................................. 1027/2011

(51) Int. Cl.
*B63B 35/44* (2006.01)
*B63B 35/00* (2006.01)
*F24J 2/52* (2006.01)
*B63B 21/50* (2006.01)
(Continued)

(52) U.S. Cl.
CPC ................ *B63B 35/00* (2013.01); *B63B 21/50* (2013.01); *B63B 35/44* (2013.01); *B63H 1/04* (2013.01); *B63H 21/17* (2013.01); *F24J 2/5269* (2013.01); *B63B 2035/4453* (2013.01); *Y02E 10/47* (2013.01)

(58) Field of Classification Search
CPC .......... B63H 21/17; B63B 21/50; B63B 35/00
USPC ...................... 114/264–267, 144 B
See application file for complete search history.

(56) References Cited

U.S. PATENT DOCUMENTS

| 4,786,795 | A | | 11/1988 | Kurashima et al. |
| 5,102,264 | A | * | 4/1992 | Thomas et al. ............... 405/198 |
| 6,827,032 | B1 | * | 12/2004 | Wobben ..................... 114/230.1 |

(Continued)

FOREIGN PATENT DOCUMENTS

| DE | 10 2006 019 753 A1 | 10/2007 |
| KR | 1020100104516 A | 9/2010 |
| WO | 2010/014310 A1 | 2/2010 |

OTHER PUBLICATIONS

Int'l Search Report issued on Sep. 27, 2012 in Int'l Application No. PCT/AT2012/050097.

(Continued)

*Primary Examiner* — Stephen Avila
(74) *Attorney, Agent, or Firm* — Panitch Schwarze Belisario & Nadel LLP

(57) ABSTRACT

An arrangement of floating platforms is provided, including (a) an anchored main platform and (b) one or more outer platforms, each of which being connected to the main platform by at least one connection element. One or more of the main and/or outer platforms are rotatable about a vertical axis by drive units which are fixed thereon. Marine engines having a propeller propulsion system are provided as drive units on the main platform and/or the outer platforms.

5 Claims, 4 Drawing Sheets

(51) Int. Cl.
*B63H 1/04* (2006.01)
*B63H 21/17* (2006.01)

(56) References Cited

U.S. PATENT DOCUMENTS 7,985,108 B1 * 7/2011 Bekker et al. ................... 440/5
2008/0257398 A1 10/2008 Laing et al.
2011/0126885 A1 * 6/2011 Kokotov et al. ............ 136/246

OTHER PUBLICATIONS

Written Opinion issued on Sep. 18, 2012 in Int'l Application No. PCT/AT2012/050097.
Int'l Preliminary Report of Pantentability issued on Jan. 14, 2014 in Int'l Application No. PCT/AT2012/050097.
Search Report issued on Feb. 20, 2012 in Austrian Patent Application No. A 1027/2011.

* cited by examiner

ARRANGEMENT OF FLOATING PLATFORMS

CROSS-REFERENCE TO RELATED APPLICATIONS

This application is a Section 371 of International Application No. PCT/AT2012/050097, filed Jul. 9, 2012, which was published in the German language on Jan. 17, 2013, under International Publication No. WO 2013/006882 A1 and the disclosure of which is incorporated herein by reference.

BACKGROUND OF THE INVENTION

The invention relates to an arrangement of floating platforms, in particular for plants for the production of solar energy.

The production of so-called alternative energy, in particular of solar energy, has been continuously rising. Due to the relatively large space required for solar power plants, the aim is to transfer them to water surfaces, in particular of the oceans ("offshore solar power plants"). Recently, various floating platforms have been developed for this purpose to carry the respective plants. Because of the requirements of a simple and lightweight design, at the same time with high load capacity, the newest platforms developed are carried by air cushions. To increase the efficiency of solar power plants carried thereon, it is important to be able to orient the platforms toward the sun, i.e. track the sun.

International patent application publication WO 2009/001225 A2, as well as Austrian Patent Application AT 509.639 A1 to Heliovis, published after the priority date of the present application, both describe preferably circular floating platforms having flexible covers each defining a hollow space that can be set under over-pressure to create the required buoyancy. The platforms are rotatable as a whole to orient their position according to the sun. Preferred embodiments in WO 2009/001225 A2 cause the rotation by wheels in a ring surrounding the platform, for which purpose the platform has to float in a circular pool. According to AT 509.639 A1, engines having water propellers are used for rotating the platform.

However, neither of these references describes how an arrangement of such platforms, i.e. of several platforms, can be used for exploiting solar energy and be oriented toward the sun, even though the large space required for a solar energy plant very often makes it necessary to divide the respective equipment on more than one floating platform, in particular to equip several platforms with solar collectors, and to operate them floating on the sea or other waters.

Systems comprising several external platforms arranged around a central platform are described in the Patent Application Publications US 2008/257398 A1 and DE 10 2006 019 753 A1. In these platform systems, external platforms are rotatable around a stationary base, wherein in both cases the use of central, engine-driven gear rings engaging into the respective counterparts on the external platforms as drive units is disclosed. That is, rotation of the external platforms is achieved by transmission of a torque from the central to the external platforms, wherein the central platform can either also be (partly) set in rotational motion (DE 10 2006 019 753 A1) or not (US 2008/257398 A1). However, in both cases a non-rotatable anchorage of the central platform on the ground (e.g. sea bottom) is required, without which no torque could be transmitted outwards.

Despite its misleading title "Floating Solar Platform," US 2008/257398 A1 describes a system that does not comprise any floating platforms at all, but three external platforms arranged around a central platform made of concrete, which external platforms serve as water basins, i.e., they contain a (shallow) water body on which lightweight soar collectors float. Thus, this system is neither designed for offshore use nor would it be suitable therefor.

In the system of DE 10 2006 019 753 A1, an upper part of a central platform called "rotating body" is set in rotation via a gear ring, which causes external platforms firmly connected thereto to rotate therewith. Furthermore, the external platforms carrying sun collectors each comprise a floating body that can be alternately filled with water or air, so that the platforms can be tilted around a horizontal axis in order to orient them toward the position of the sun.

However, none of the systems according to the state of the art describes a platform arrangement in which the external platforms carrying solar collectors can be moved independently of the central platform.

BRIEF SUMMARY OF THE INVENTION

Against this background, the object of the invention was to develop a platform system suitable to overcome the above disadvantages.

The invention achieves this object by providing an arrangement of floating platforms comprising a) an anchored central platform and b) one or more external platforms each connected to a central platform via a connecting element, wherein one or more of the platforms are rotatable around a vertical axis by drive units mounted thereon, the inventive arrangement being characterized in that marine engines having screw propellers are provided as drive units at the central platform and/or at external platforms.

Furthermore, in preferred embodiments, one or more of the external platforms are pivotably supported on the respective connecting element. Herein, "rotate" means a rotation of a platform around the center of its surface, while "pivot" means a rotation around a peripheral point; of course, both movements are around a vertical axis.

By such an inventive arrangement, the external platforms can now be moved independently of the central platform and sometimes also independently of each other, because the marine engines attached to the respective platforms can be operated independently of each other.

Since the central platform does not necessarily have to be anchored non-rotatably on the water bottom, all platforms can, for example, be simultaneously rotated around a vertical axis, which is not possible with systems according to the state of the art, such as those disclosed in US 2008/257398 A1 and DE 10 2006 019 753 A1.

Of course, the central platform can also be anchored non-rotatably, so that, in preferred embodiments, the external platforms can be pivoted around vertical axes running through the connection points with the respective connecting elements. Alternatively, all platforms can be rotated simultaneously, and the external platforms can be additionally pivoted. By the two movements, rotation and pivoting, the respective platforms can track the sun, which strongly increases the efficiency of a solar power plant carried thereon.

Correspondingly, "anchoring" of the central platform herein means a rotatable connection with the bottom of the water, e.g. the sea bottom, for example by conventional anchors and anchor chains, as well as a steady position on the water bottom. In the latter case, of course, the central platform is anchored non-rotatably. However, substantially non-rotatable anchoring can also be provided by several conventional anchors.

Herein, "vertical axis" means an axis that is substantially perpendicular to the plane of the respective platform.

In addition, the external platforms can also be anchored, as long as the anchoring does not affect their pivotability. For example, conventional anchors having sufficiently long anchor chains can be used.

For implementing the above modes of movement, the invention distinguishes in particular between the following embodiments:

1) The central platform is anchored non-rotatably and one or more of the external platforms are supported pivotably on the respective connecting elements.

2) The anchored central platform is rotatable around a vertical axis preferably substantially running through the anchor point, and the external platforms are connected non-rotatably with the respective connecting elements.

3) The anchored central platform is rotatable around a vertical axis, preferably substantially running through the anchor point, and the one or more external platforms are pivotably supported on the respective connecting elements.

Depending on which platforms are moved, the vertical axis runs through different points. When the external platforms are pivoted, the vertical axis substantially runs through the connecting or supporting point of the external platform with the respective connecting element. When the anchored central platform and thus the entire arrangement is rotated, the vertical axis substantially runs through the anchor point, which does not mean the anchor on the sea bottom but the connecting point of the platform with the anchor chain.

For pivoting, suitable connections and supports have to be provided between the connecting elements and the external platforms as they are known to a person skilled in the art.

The material of the connecting elements is not particularly limited, but in view of a stable anchoring on the central platform and of the power transmission during pivoting or rotating, steel constructions protected against corrosion should preferably be used, which will become clearer below in connection with the drawings.

Pivoting of the external platforms as well as rotating of the entire arrangement of floating platforms occurs by one or more marine engines having screw propellers that are mounted at the respective platforms. In view of the use of the platform arrangement for solar power plants, electric motors are preferred that can be operated with part of the solar energy obtained.

Preferably, each platform is provided with several marine engines. Thus, the power required for the movement can be distributed among several engines, and some engines can be used for movements of the respective platforms in one direction, while others can be used for movements in the opposite direction.

Furthermore, during rotation of the entire arrangement the power required is preferably exclusively or mainly provided by marine engines provided at the external platforms, in any case not exclusively by marine engines at the central platform, so that the torque required for rotation can be achieved with less power.

Pivoting of the external platforms as well as rotating of the entire arrangement preferably comprises a rotation of at least 180°, more preferably at least 210°, even more preferably at least 240°, and, in particular at least 270°. This allows the use of the inventive arrangement as carrier for solar power plants adapted to the geographic latitude and the time of the year. In preferred embodiments, the rotation of the entire arrangement can also comprise a rotation of 360°, for which the anchor chain has to be supported at the central platform in a corresponding way.

In further preferred embodiments, the respective connecting elements are non-rotatably connected to the central platform at at least two linkage points, so that they can transmit the rotational force provided by the marine engines and acting on the respective platform(s) in an optimal manner, e.g. either from the central platform to the external platforms or vice versa, preferably vice versa.

In particular, but not exclusively, in embodiments in which the central platform has a steady stand on the bottom of the water, e.g. mainly the sea bottom, the connecting elements are preferably slidably connected with a rod assembly of the central platform and thus connected height-adjustably with the central platform to compensate height differences due to the tides or waves. This is not provided in the state of the art according to US 2008/257398 A1 and DE 10 2006 019 753 A1, either.

The design, dimensions and shape of the platforms of the inventive arrangement are not particularly limited. Preferably, a lightweight design is selected for the external platforms, e.g. by use of buoyancy or floating bodies as well as pneumatic concentrators. In the case of offshore solar power plants, the central platform on which the heavy parts of the plants, i.e. generators, turbines and the like, are preferably carried, is preferably implemented in a conventional design of offshore oil or gas platforms.

Sometimes, the dimensions also depend on the number of external platforms. In case of a given surface of sun collectors, for example, it can be distributed on a smaller number of larger or a higher number of smaller platforms. The determining parameters here are mainly production and operation costs. The dimensions of the central platform as well as the external platforms can be, for example, between a few meters and several hundred meters. In addition, the dimensions of the central platform and the external platforms have to be coordinated with the shape and length of the connecting elements.

The cross-sectional shape of the platforms is not particularly limited, but round platforms are selected in view of stability against drifting, or substantially square platforms are selected in view of inexpensive production.

Furthermore, the point of attachment of the corresponding marine engine(s) on the platform is not particularly limited. When, for example, the external platform has a substantially square shape, it is preferred to provide at least one connecting element with the central platform at one corner of the square and at least one engine at the corner diagonally opposite of the connecting element, which can, depending on the embodiment, benefit the rotation of the entire system as well as the pivoting of the individual platforms.

In a second aspect, the invention relates to the use of the inventive arrangement of floating platforms, according to the first aspect described above for carrying a plant for generating solar energy, wherein in preferred embodiments the entire arrangement is rotated for tracking the sun and/or the external platforms are pivoted.

BRIEF DESCRIPTION OF THE SEVERAL VIEWS OF THE DRAWINGS

Below, preferred embodiments of the invention are described in more detail with reference to the attached drawings, wherein.

DETAILED DESCRIPTION OF THE INVENTION

Figure 1:
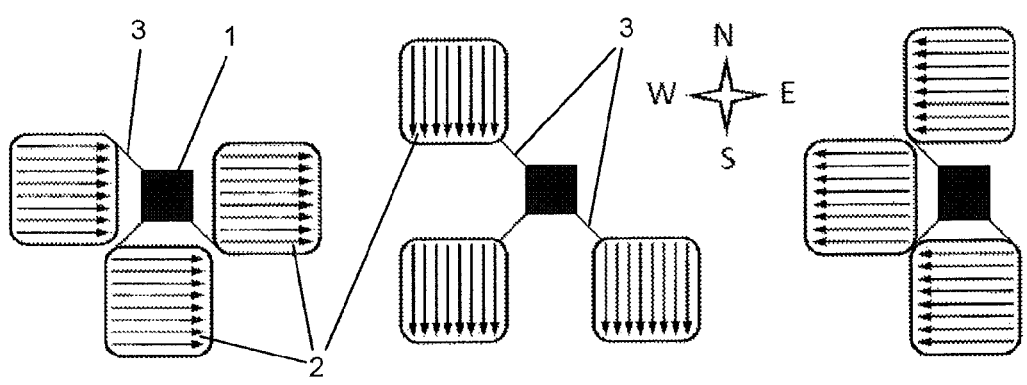
FIG. 1 is a schematic representation in plan view of an embodiment of the inventive arrangement of floating platforms having three external platforms in three different positions (FIGS. 1a, 1b and 1c).

FIG. 1 shows a preferred embodiment of the inventive arrangement of floating platforms having three external platforms 2 connected to the central platform 1 via respective connecting elements 3. The external platforms 2 are pivotable around the support points at the respective connecting elements 3. The central platform is assumed to be non-rotatably anchored in this embodiment. The arrows show the positions of sun collectors carried on the external platforms with regard to the cardinal points.

FIG. 1a shows a schematic representation of the positions of the external platforms in the morning. The arrangement is in a position that the sun collectors are oriented toward the east. In the course of the day, the external platforms 2 go through a tracking movement by marine engines (not shown) so that the sun collectors are oriented toward the south at noon, as shown in FIG. 1b, and toward the west in the evening, see FIG. 1c. Thus, the external platforms 2 are pivotable by at least 180° C. After sunset the external platforms 2 can be pivoted back to their initial position.

In addition to this pivoting, the entire arrangement may also be rotated around a vertical axis through the central platform, unless it is anchored non-rotatably. In this case, the external platforms 2 do not have to be pivotable by 180°.

Figure 2:
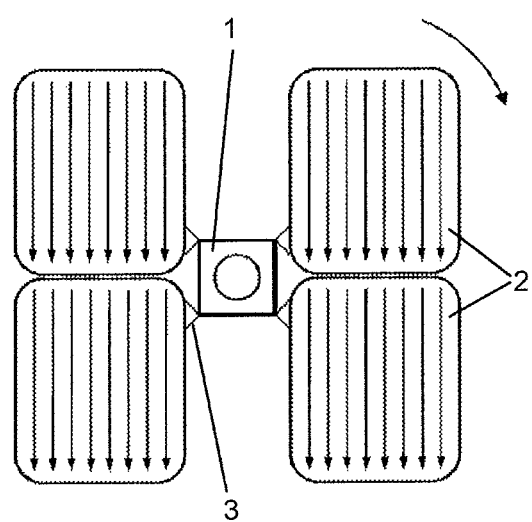
FIG. 2 is a schematic representation in plan view of a further embodiment of the inventive arrangement of floating platforms having four external platforms.

FIG. 2 shows a further embodiment of the invention having four external platforms 2, again connected to a central platform 1 via respective connecting elements 3. Here, the external platforms 2 are non-rotatably connected to the connecting elements 3, i.e. not pivotable. However, the central platform 1 and thus the entire arrangement is rotatable around a vertical axis running through the central platform 1, as is shown by the curved arrow in the upper right corner. In this case, tracking is thus achieved by rotating all platforms.

With a corresponding anchoring of the platform 1, a 360° rotation is also possible, in which case rotation in the opposite direction, i.e. back to the initial position for the next day, is not necessary, provided that the sea cable for discharging the produced electric current comprises a pivot joint.

Figure 3:
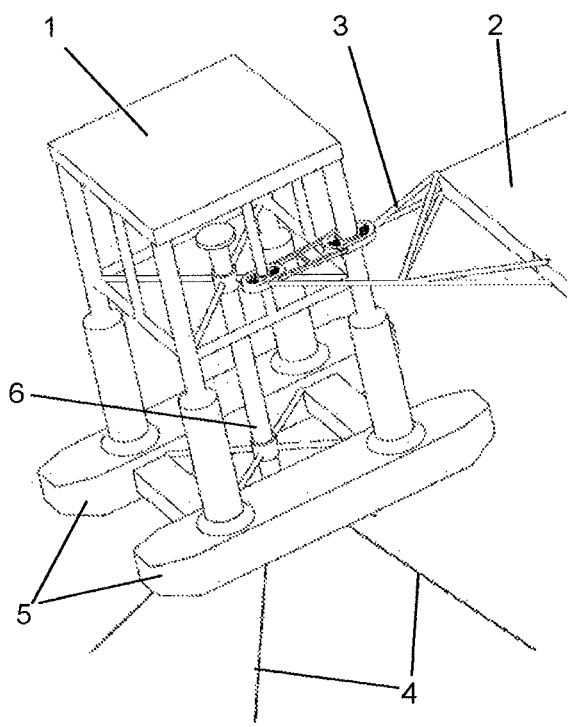
FIG. 3 is a schematic representation in a perspective view of the linkage of the connecting element at the central platform.

FIG. 3 shows a schematic representation of the non-rotatable connection between the central platform 1 and a connecting element 3 with an external platform 2. It can be seen that the connecting element 3 is a frame stabilized by braces linked to the central platform 1 at two points.

Furthermore, the anchoring of the central platform can be seen, an example of which is shown by four schematic anchor chains 4. The anchor chains 4 are connected to a stationary vertical pivot 6. Since this connection is rotatable, the central platform 1 can rotate around the pivot arranged in the rotation axis and is thus rotatably anchored in this embodiment. In addition—just like the external platforms—it is provided as a floating platform, which is shown by two pontoons 5. Furthermore, the design of the central platform 1 can be seen, comprising a frame which is kept stable by braces.

Figure 4:
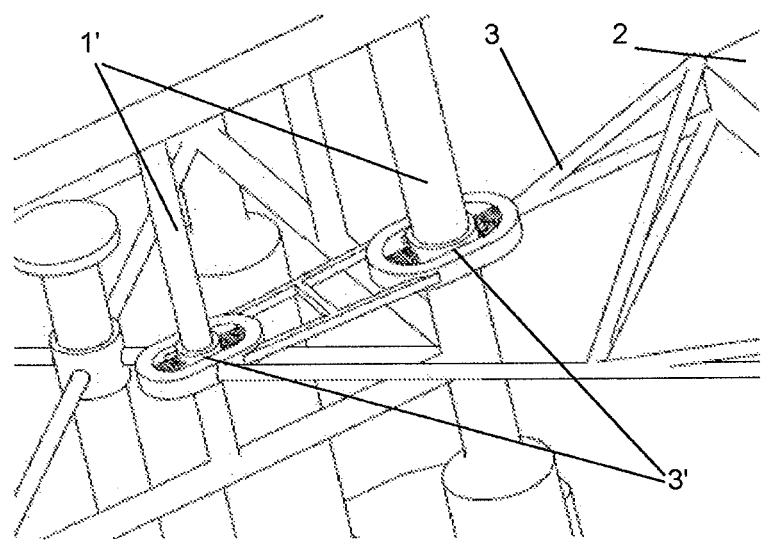
FIG. 4 is a magnification of a detail from FIG. 3.

FIG. 4 is a magnification of a detail from FIG. 3, i.e. the linkage of the connecting element 3 at the central platform, in which the two linkage points 3' are marked. Furthermore, it shows that, with such a linkage, the connecting element 3 and thus the external platforms 2 are slidably connected with the central platform 1 and are consequently connected therewith in a height-adjustable manner, since the connecting element 3 can slide up and down the rods 1', e.g. in case of high waves. Even though the relative height of the linkage point may vary during operation, a torque can be transmitted from the central platform to the external platforms or vice versa in any situation via the marine engines mounted at the central platform or the external platforms.

Thus, for the first time, the arrangement of the invention provides the possibility to move several floating platforms—preferably platforms carrying an offshore solar power plant—in a concerted manner and independently of each other, in particular to effect tracking of solar collectors carried thereon according to the position of the sun.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the invention as defined by the appended claims.

We claim:

1. An arrangement of floating platforms, the arrangement comprising (a) an anchored central floating platform rotatable around a vertical axis and (b) one or more external floating platforms each connected to the central floating platform via a connecting element, each external floating platform being non-rotatably connected with the respective connecting element, wherein one or more of the central and external floating platforms are rotatable around the vertical axis by drive units mounted thereto, wherein the drive units comprise marine engines having screw propellers mounted at the central floating platform and/or at the external floating platforms, wherein the arrangement is adapted to carry a solar power plant; and wherein the arrangement in its entirety is rotatable and/or the external floating platforms carry solar collectors and are pivotable to orient the solar collectors toward the sun.

2. The arrangement of floating platforms according to claim 1, wherein the marine engines are electric motors.

3. The arrangement of floating platforms according to claim 1, wherein the entire arrangement is rotatable around the vertical axis by the marine engines.

4. An arrangement of floating platforms, the arrangement comprising (a) an anchored central floating platform and (b) one or more external floating platforms each connected to the central floating platform via a connecting element, wherein respective connecting elements are non-rotatably connected to the central floating platform at at least two linkage points and wherein one or more of the central and external floating platforms are rotatable around a vertical axis by drive units mounted thereto, wherein the drive units comprise marine engines having screw propellers mounted at the central floating platform and/or at the external floating platforms;

wherein the arrangement is adapted to carry a solar power plant; and wherein the arrangement in its entirety is rotatable and/or the external floating platforms carry solar collectors and are pivotable to orient the solar collectors toward the sun.

5. An arrangement of floating platforms, the arrangement comprising (a) an anchored central floating platform and (b) one or more external floating platforms each connected to the central floating platform via a connecting element, wherein one or more of the central and external floating platforms are rotatable around a vertical axis by drive units mounted thereto,
- wherein the drive units comprise marine engines having screw propellers mounted at the central floating platform and/or at the external floating platforms;
- wherein the arrangement is adapted to carry a solar power plant;
- wherein the arrangement in its entirety is rotatable and/or the external floating platforms carry solar collectors and are pivotable to orient the solar collectors toward the sun; and
- wherein the connecting elements are slidably connected with a rod assembly of the central floating platform and are thus connected height-adjustably therewith.

* * * * *